United States Patent [19]

Griffiths et al.

[11] Patent Number: 5,481,602
[45] Date of Patent: Jan. 2, 1996

[54] METHOD AND APPARATUS FOR ALTERNATE DESTINATION ROUTING FOR SWITCHING EGRESS CUSTOMERS

[75] Inventors: Richard W. Griffiths, Red Bank, N.J.; Rose A. Krilcich; William G. Kuchenbecker, both of Naperville, Ill.; Bryan M. Richardson, Westminster, Colo.

[73] Assignee: AT&T Corp., Murray Hill, N.J.

[21] Appl. No.: 364,361

[22] Filed: Dec. 27, 1994

[51] Int. Cl.[6] .................................................... H04M 3/54
[52] U.S. Cl. .......................... 379/210; 379/201; 379/207; 379/211; 379/212
[58] Field of Search .................................... 379/201, 207, 379/210, 211, 212, 221, 220, 230, 46, 265, 266

[56] References Cited

U.S. PATENT DOCUMENTS

| | | | |
|---|---|---|---|
| 4,674,115 | 6/1987 | Kaleita et al. | 379/201 |
| 5,206,901 | 4/1993 | Harlow et al. | 379/211 |
| 5,369,695 | 11/1994 | Chakravarti et al. | 379/230 |

*Primary Examiner*—Jeffery A. Hofsass
*Assistant Examiner*—Scott Wolinsky

[57] ABSTRACT

Redirection of calls from a busy primary destination to a secondary destination of a switched egress alternate destination redirection (ADR) customer is performed in the absence of sufficient terminating line status information in the form of either a busy or free indication being provided to the originating switch which provides the ADR service feature capability. The originating switch infers that the primary destination is busy and redirects the call to the secondary destination accordingly if the time that passes since the inception of the call is greater than a predetermined interval in which the call has not been answered.

26 Claims, 3 Drawing Sheets

METHOD AND APPARATUS FOR ALTERNATE DESTINATION ROUTING FOR SWITCHING EGRESS CUSTOMERS

FIELD OF THE INVENTION

This invention relates generally to telephone switching networks. More particularly, the present invention relates to the redirection of a telephonic communication from a busy primary destination to a secondary destination when sufficient terminating line status information in the form of either a busy or free condition indication is not provided by a terminating local egress switch of a local exchange carrier to an originating switch of a long distance carrier.

BACKGROUND OF THE INVENTION

An originating telephone communication switch belonging to a long distance exchange carrier provides telephone service instructions which enable a customer, known as an alternate destination redirection (ADR) customer, to have calls redirected from a primary destination to a secondary destination, when the primary destination is busy or the call has not been answered within a predetermined interval, called a ring no answer (RNA) condition.

The primary destination of the ADR customer, in many circumstances, is directly connected to a terminating switch which is included in a long distance exchange carrier network, in other words, a switching network owned by the long distance carrier. If this is the case, the terminating switch provides an indication to the originating switch whether a busy or RNA condition exists at the primary destination. Accordingly, the originating switch determines whether redirection of the call to the secondary destination is appropriate.

When a call to the primary destination must be routed through a local exchange carrier network, in other words, a switching network owned by a local exchange carrier, all calls from the terminating switch of the long distance carrier to called destinations in the local network are routed by a local egress switch in the local network. An ADR customer whose call is routed first through the long distance network and then to the local network which includes the primary destination is known as a switched egress customer.

Sometimes, the local switch of the local carrier does not provide sufficient terminating line status information in the form of either a busy or free indication to the terminating switch of the long distance carrier, and ultimately the originating switch of the long distance carrier, when the primary destination in the local network is busy. Normally, without either a busy or free indication, the ADR feature of busy redirection to a secondary destination cannot be implemented, because the originating switch cannot determine whether or not the call is busy and thus redirect the call.

SUMMARY OF THE INVENTION

The present invention provides method and apparatus for an originating switch to determine whether to redirect a telephone communication from a busy primary destination to a secondary destination of a switched egress ADR customer, when sufficient terminating line status information in the form of either a busy or free indication is not transmitted by a local egress switch to the originating switch which provides the ADR service feature.

The originating switch first attempts to complete a call to the primary destination of the ADR customer. If the originating switch does not receive sufficient terminating line status information about the busy primary destination at the onset of the call from the local switch, the originating switch starts a timer which is set for a predetermined time interval. After starting the timer, the originating switch plays audible or fake ringing to the calling party over a voice path.

The originating switch redirects the call to the secondary destination of the switched egress ADR customer only if the predetermined time interval expires before the called party answers the call. In the case where the primary destination is actually busy, but the originating switch cannot detect this condition, the timer will expire and the originating switch will redirect the call to the secondary destination. This redirection is accomplished when the calling party, upon hearing the fake ringing, waits long enough for the timer to expire. On the other hand, if the call is answered at the primary destination prior to the expiration of the timer, no redirection occurs.

The many advantages of the present invention will be readily apparent from the detailed description and the drawings that follow.

DETAILED DESCRIPTION

Figure 1:
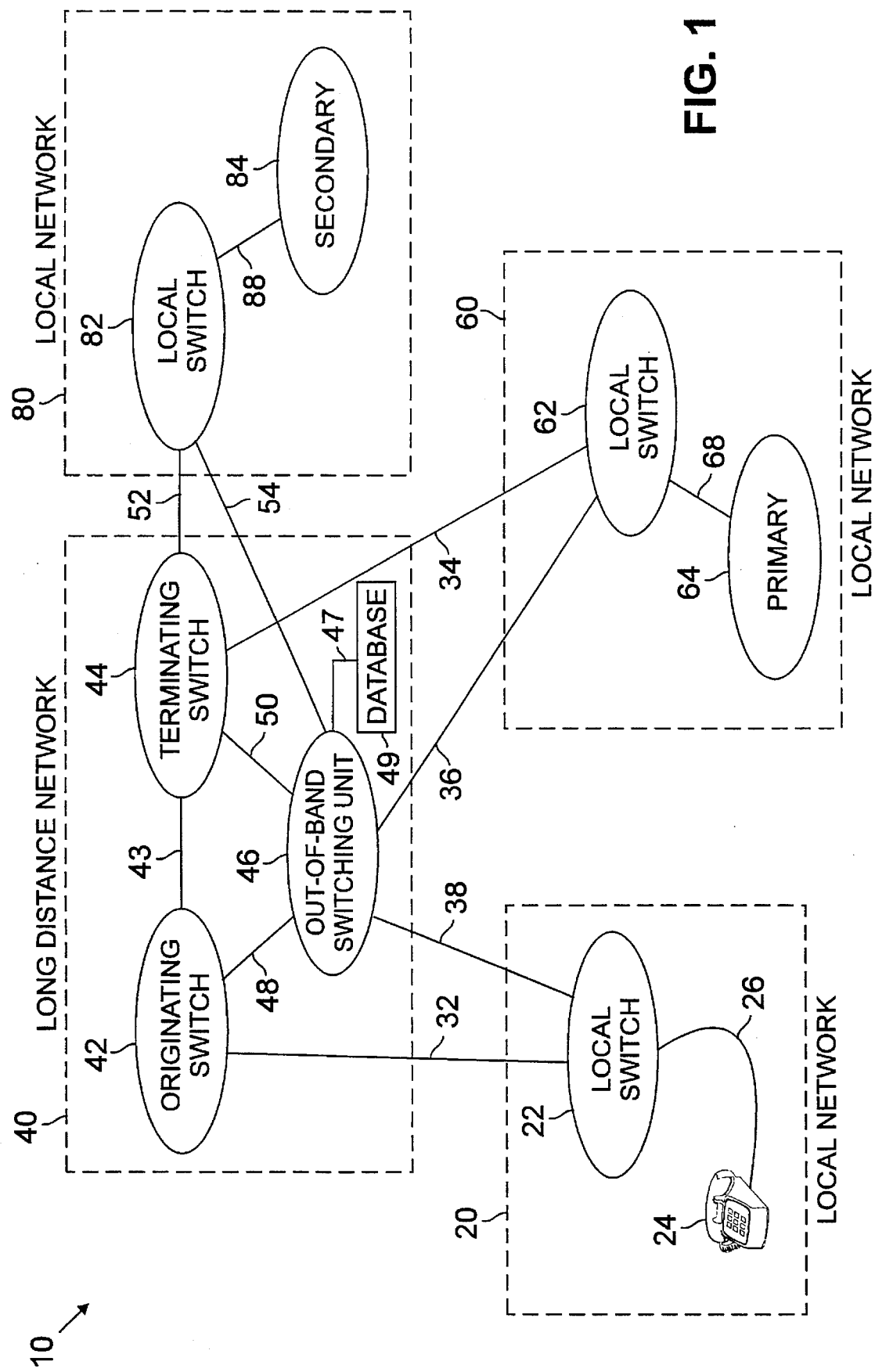
FIG. 1 illustrates an improved switched egress network according to the present invention.

FIG. 1 shows a switched egress telecommunication network 10. The network 10 is exemplary of a network where a local egress switch included in a local network belonging to a local exchange carrier ultimately is used to route a telephone call to one of a plurality of destinations subscribed to by an alternate destination redirection (ADR) customer of a long distance exchange carrier. As explained below, the network 10 is used to illustrate the redirection of a telephone call to an alternative or secondary destination of the ADR customer when a primary destination is busy and the local egress switch in the local network containing the primary destination does not provide any indication of the busy condition at the primary destination to an originating switch of the long distance carrier.

For purposes of clarity in explaining this invention, only one alternative destination which is located in a local network distinct from that local network containing the primary destination is included in the network 10.

It is to be understood that an ADR customer may subscribe to a plurality of alternative redirection destinations which may be included in one or more distinct local networks. Further, it is to be understood that one or more alternative redirection destinations may be included in the local network containing the primary destination of the ADR customer.

The network 10 may suitably comprise a first local network 20, a long distance network 40, a second local network 60 and a third local network 80. The local network 20, which is typically owned by a local exchange carrier, comprises a local egress switch 22 which is connected to a caller unit 24 by a line 26.

The long distance network 40, which is typically owned by a long distance exchange carrier, comprises an originating switch 42, a terminating switch 44, an out-of-band signalling unit 46 and a database 49. Signalling links 48, 49 and 50 connect the out-of-band signalling unit 46 to the originating switch 42, the database 49 and the terminating switch 44, respectively. The originating switch 42 is connected to the terminating switch 44 via a trunk 43.

The local network 60, which may or may not be owned by the local telephone carrier or carriers that own the local networks 20 and 80, comprises a local egress switch 62 connected to a primary destination terminal 64 by a line 68. Similarly, the local network 80 comprises a local egress switch 82 connected to a secondary destination terminal 84 by a line 88. It is to be understood that the local switches 62 and 82 may be connected to the primary and secondary destinations 64 and 84, respectively, through other local switches according to techniques well known in the art.

In the network 10, the components within the local networks 20, 60 and 80 and the long distance network 40 are connected to each other as follows. A trunk 32 connects the local switch 22 to the originating switch 42. The local switch 62 is connected to the terminating switch 44 by a trunk 34, and to the out-of-band signalling unit 46 via a signalling link 36. Similarly, the local switch 82 is connected to the terminating switch 44 by a trunk 52, and to the out-of-band signalling unit 46 via a signalling link 54. A signalling link 38 connects the out-of-band switching unit 46 to the local switch 22. It is noted that in some switched egress networks, any of the signalling links 36, 54 and 38 connecting the local switches 62, 82 and 22, respectively, with the out-of-band signalling unit 46 may not exist.

The caller unit 24 and the primary and secondary destinations 64 and 84, respectively, may suitably be audio information transmitting and receiving devices, such as telephones. The out-of-band switching unit 46 is exemplary of a well known device that routes out-of-band signals to the appropriate destination based on the protocol encoded on the transmitted out-of-band signal. Local switches 22, 62 and 82 and the originating and terminating switches 42 and 44, respectively, may be any suitable telephone switch that routes calls to and from calling and called parties or destinations using techniques well known in the art.

The terminating switch 44 in the long distance network 40 routes audio and signalling information for controlling call processing between the originating switch 42 and the local switches 62 and 82. It is to be understood, however, that a terminating switch in a long distance network which routes audio and signalling information to a primary destination of an ADR customer may not be the same terminating switch that routes audio and signalling information to a secondary destination of the ADR customer.

Signalling information may be received by the terminating switch 44 from the local switches 62 and 82 by one of two methods: either in-band signalling over the trunks 34 and 52, respectively, or out-of-band signalling via the out-of-band signalling unit 46. For example, the terminating switch 44 may receive out-of-band signalling information from the local switch 62 via the out-of-band switching unit 46 over the signalling links 36 and 50. Out-of-band signals are also transmitted between the terminating switch 44 and the originating switch 42 via the out-of-band signalling unit 46 over the signalling links 50 and 48.

The terminating switch 44 receives in-band signals from the local switch 62 via the trunk 34 only if the local switch 62 is not connected to the out-of-band signalling unit 46, in other words, if the signalling link 36 is not present. Using well known techniques, the terminating switch 44 converts in-band signalling information to out-of-band signals, and routes these converted signals to the originating switch 42 in the same manner that it routes out-of-band signals to the originating switch 42, as described previously. Sometimes, some call status information is not reported by the terminating switch 44 to the originating switch 42 due to either the limits of the conversion process or the lack of information received from the local networks.

The database 49 may suitably be a well known data storage device. Call routing information which is stored in the database 49 may be retrieved by the out-of-band switching unit 46 over the signalling link 47 for further routing in the long distance network 40.

The originating switch 42 in the long distance network 40 may suitably be a well known device that performs the task of ensuring that audio information is routed along the appropriate trunk lines to a desired destination according to the routing number provided with the signalling information. The originating switch 42 retrieves routing information from the database 49 via the out-of-band signalling unit 46 to determine the routing numbers belonging to an ADR customer. Upon determining that the routing number provided belongs to an ADR customer, the originating switch 42 then determines how to route audio information between the calling party at the caller unit 24 and the called party, which in the network 10 is either the primary destination 64 or the secondary destination 84, by processing the signalling information it receives from the terminating switch 44 and the local switches 62 and 82. As explained below, the signals transmitted from the terminating switch 44 may contain information concerning the status of the called party to which the originating switch 42 has routed the call.

A telephone call to an ADR customer of the long distance network 40 is routed in the network 10 in the following manner. The telephone call is placed at the caller unit 24 and routed over the line 26 to the local switch 22. The local switch 22 routes the call, along with the appropriate signalling information, to the originating switch 42 via the out-of-band switching unit 46 and the signalling link 48 only if the signalling link 38 is included in the network 10. Otherwise, routing of signalling information from the local switch 22 to the originating switch 42 occurs over the trunk 32.

The originating switch 42 then routes the call along with the appropriate signalling information via the terminating switch 44 to the local switch 62 because the local network 60 contains the primary destination 64. The terminating switch 44 will utilize the out-of-band signalling unit 46 for routing the call and signalling information to the local switch 62 only if the signalling link 36 is included in the network 10 for transmitting signalling information to the local switch 62. On the other hand, if the signalling link 36 is not included in the network 10, routing of signalling information from the terminating switch 44 to the local switch 62 occurs over the trunk 34.

The local switch 62 then attempts to complete the call to the primary destination 64. The local switch 62 may provide information to the terminating switch 44 concerning the call status of the primary destination 64 by transmitting signalling information using either one of the following methods: 1) in-band signalling over trunk 34; or, 2) out-of-band signalling over signalling links 50 and 36 via the out-of-band signalling unit 46, where the signalling link 36 is included in the network 10. This signalling information may contain the following call status data: the call has been answered; the call is still ringing and has not been answered; the call has been completed; a busy indication; or, a free indication. It is to be understood that the originating switch 42 can only receive either a busy or a free condition indication if both of these indications are provided as part of the signalling information, because these conditions are mutually exclusive. The terminating switch 44 routes the signalling information it receives to the originating switch 42 as explained above.

The originating switch 42 evaluates the information contained in these signals to determine the status of the call upon initial routing, and whether and in what manner, if any, it should provide for connecting a voice path between the caller unit 24 and the called party. For instance, if the signalling information indicates that the primary destination 64 is free, a voice path from the caller unit 24 to the primary destination 64 is established through conventional switching techniques involving the local networks 20 and 60 and the long distance network 40, such that the caller unit 24 may hear voice signals which may be provided by the primary destination 64 if the call is answered. On the other hand, if the primary destination 64 is busy and the originating switch 42 is provided with an indication of this condition, the originating switch 42 does not establish a voice path between the caller unit 24 and the initially called primary destination 64. The originating switch 42, instead, redirects the call to the secondary destination 84 according to well known ADR techniques.

In the switched egress network 10, when the originating switch 42 does not receive either a busy or free indication from the local switch 62 because the local switch 62 does not have the capability to provide such indications and a busy condition exists at the called primary destination 64, a prior art originating switch would not normally be able to provide the ADR service feature of redirecting calls to a switched egress ADR customer. The originating switch 42, however, does provide this ability, as explained below.

In accordance with the present invention, method and apparatus for the originating switch 42 to determine whether a call to a switched egress ADR customer should be redirected to an alternative destination, even when either a busy or free indication is not provided, are described with reference to a process 100 shown in FIG. 2. FIG. 3 shows the originating switch 42 in generalized block diagram form comprising components which may be suitably included therein for performing the functions described in the process 100 in accordance with the inventive technique. For the sake of clarity, the process 100 is described with respect to the routing of calls to a switched egress ADR customer having the primary and secondary destinations 64 and 84, respectively, as shown in the network 10 of FIG. 1. It is to be understood that the technique of the present invention may be similarly applied for an ADR customer who subscribes to a plurality of alternative destinations.

Referring to FIG. 3, the originating switch 42 may be suitably designed to include components which may detect and transmit signalling information associated with switching a call in the network 10, measure a predetermined time interval, read data from and write data to a memory and provide an audible signal for routing to an alternate destination of an ADR customer. In accordance with the present invention, the originating switch 42 may suitably comprise a signalling information detector 91, a signalling information transmitter 92, a timer 93, a memory 94 and an announcer 95, all connected to a processor 96 in a conventional manner for performing the operations described below in the process 100.

The detector 91 may suitably be any device that (i) detects signalling information, such as, for example, call processing event data, that may be routed to the originating switch 42 from the terminating switch 44, the out-of-band signalling unit 46 or the local switch 22, and (ii) routes the detected signalling information or data representative of detected signalling information for further processing. The transmitter 92 may suitably be any device that may be operated to transmit signalling information associated with switching operations typically performed in switching a call in the network 10. The timer 93 may suitably be a standard timing device, such as a counter, that may be utilized for timing a predetermined interval. The announcer 95 may be any suitable device that may be operated to provide audible ringing for routing to a calling party in the network 10.

The processor 96 may be any suitable microprocessor or microcontroller that may control and monitor the operations of the detector 91, the transmitter 92, the timer 93 and the announcer 95, and read data from and write data to the memory 94 using conventional techniques. The memory 94 may be used as a store of data associated with ADR switching, such as, for example, the subscribed ADR destinations of an ADR customer retrieved from the database 49. For purposes of this invention, the processor 96 may process signalling information in the same form as it is received at the detector 91.

Figure 2:
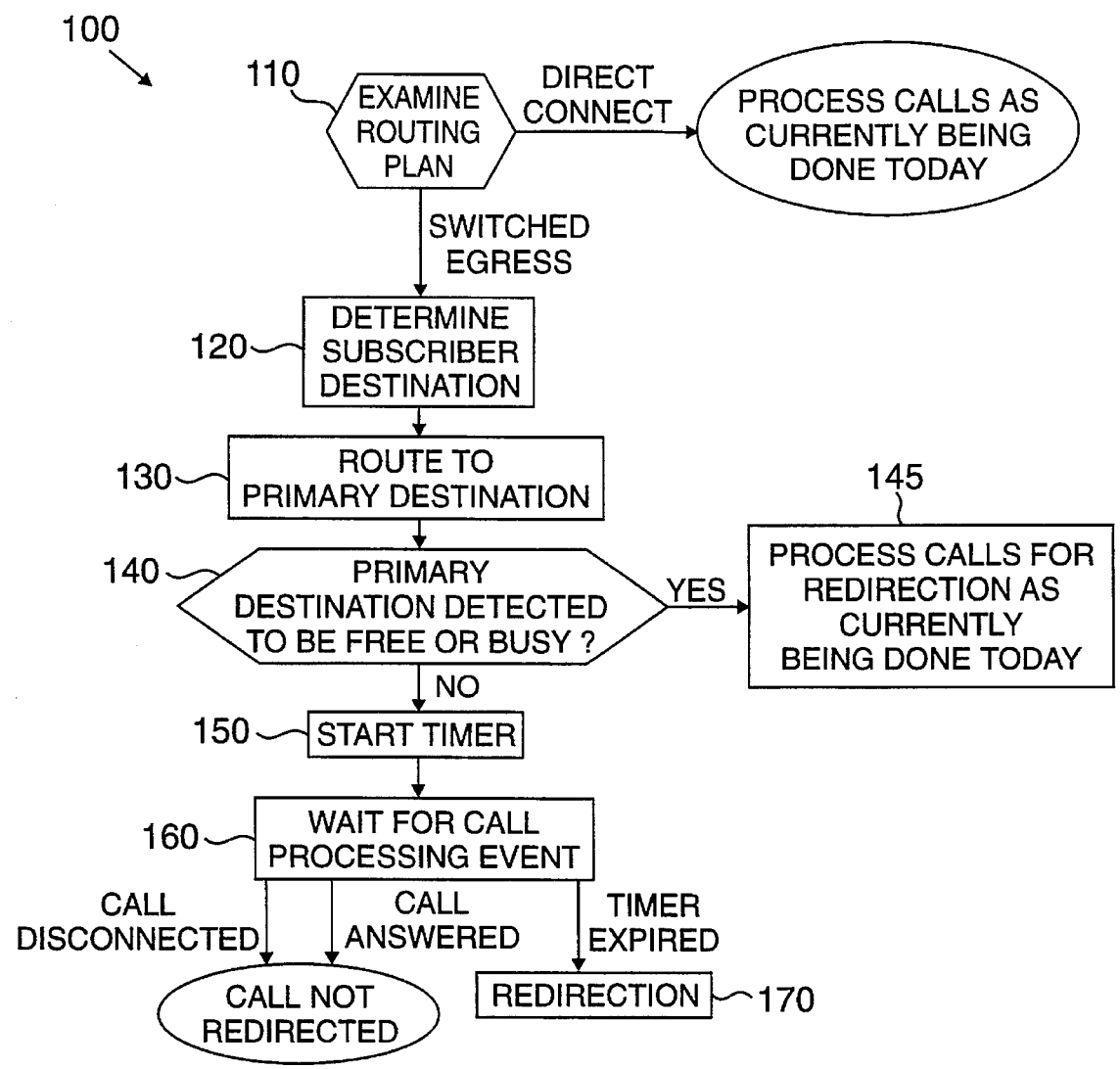
FIG. 2 is a flow diagram of a method according to the present invention for redirecting a telephone call for a switched egress ADR customer, when either a busy or free indication is not provided to the originating switch in the network of FIG. 1.
Figure 3:
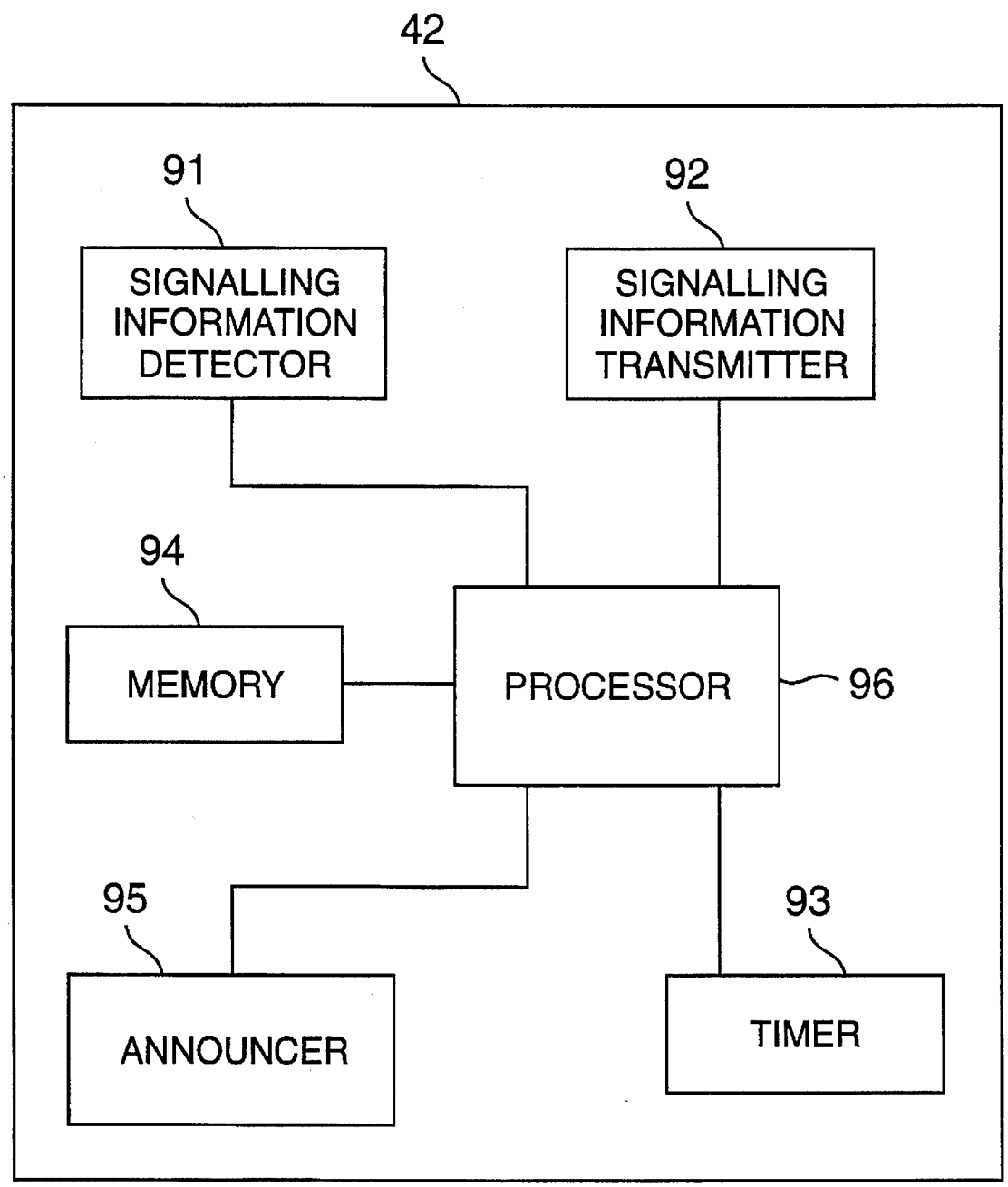
FIG. 3 illustrates an originating switch which may be included in the network of FIG. 1 for implementing the features of the present invention.

Referring to FIG. 2, in step 110, the processor 96 of the originating switch 42 of the long distance network 40 is provided with signalling information received at the detector 91 which was routed to the originating switch 42 by the local switch 22 and is associated with an ADR call dialed at the caller unit 24. The processor 96 then provides control signals to the signalling information transmitter 92 to effectuate the retrieval of routing information from the database 49. The retrieved routing information is detected by the signalling information detector 91 and then stored in the memory 94 by the processor 96. The processor 96 then accesses and processes the routing information stored in the memory 94 to determine whether the dialed number corresponds to that of a switched egress ADR customer. If the called party is not a switched egress ADR customer, the processor 96 provides control signals to the transmitter 92 directing the transmitter 92 to provide suitable signalling information for completing the call by direct connect methods which are well known in the art and not a part of this invention. If the called party is a switched egress ADR customer, step 120 is executed.

In step 120, the processor 96 accesses the memory 94 to collect the subscribed destinations of the ADR customer.

Then, in step 130, the processor 96 provides control signals to the transmitter 92 which direct the transmitter 92 to provide out-of band signalling information to the terminating switch 44 for routing the call to the primary destination 64. The terminating switch 44, in turn, provides either in-band or out-of-band signalling information, concerning the routing of the call to the local switch 62, over either the trunk 34 for the former or the signalling links 50 and 36 for the latter.

After receiving the signalling information concerning the call being attempted by the caller unit 24, the local switch 62 determines whether the call may be completed to the primary destination 64. The local switch 62, in other words, attempts to determine whether a busy condition exists at the primary destination 64. Depending upon the particular configuration of the network 10 and the signalling capabilities of the local switch 62, the local switch 62 may or may not transmit signalling information, either in-band or out-of-band, in the form of busy or free indications back to the terminating switch 44. As explained above, the terminating switch 44 routes any signalling information it receives from the local switch 62 to the detector 91 of the originating switch 42, so that the processor 96 of the originating switch 42 may perform the determination described below in step 140.

In step 140, the detector 91 provides the processor 96 with any signalling information that the detector 91 receives from the terminating switch 44. The processor 96 evaluates this signalling information to determine whether to provide control signals to the timer 93 for commencing or initiating the timing of a predetermined interval. The timer 93 is not initiated for timing if the local switch 62 has provided sufficient signalling information to the detector 91 to permit the processor 96 to determine whether the called destination is busy or free at the primary destination 64.

If, in step 140, the processor 96 determines that the primary destination 64 is busy from the receipt of a busy indication, the timer 93 is not initiated for timing. The processor 96, consequently, does not redirect the call according to the techniques of the process 100. Instead, because sufficient signalling information is provided for the processor 96 to detect the presence of a busy destination, in step 14B, the processor 96 provides control signals to the transmitter 92 for redirecting the call to the secondary destination 84 according to well known techniques.

If, in step 140, the processor 96 determines that the primary destination 64 is free from the receipt of a free indication, the processor 96 then in step 145 starts a timer not associated with the present invention for the purpose of call redirection. Redirection then commences according to well known techniques if this timer measures a user defined predetermined time interval before the call is answered at the primary destination 64.

On the other hand, if the detector 91 receives insufficient signalling information from the local switch 62, such that the processor 96 cannot explicitly determine whether a busy or free condition exists at the primary destination 64, the processor 96 proceeds to perform step 150.

In step 150, the processor 96 provides control signals to the timer 93 for commencing the timing of a predetermined interval. In accordance with the present invention, the timer 93 is set to measure a predetermined, maximum time interval. At this point, one of two conditions is true concerning the primary destination 64: it is either busy or ringing. The processor 96, however, cannot precisely determine which of these conditions is true. The processor 96, therefore, does not perform cut through, in other words, does not provide control signals to the transmitter 92 for establishing a voice path between the caller unit 24 and the primary destination 64. Instead, the processor 96 provides control signals to the announcer 95 which directs the announcer 95 to play fake or audible ringing to the caller unit 24. Ringing is played to ensure that the caller does not hear a busy signal or tone if the primary destination 64 is indeed busy. The announcer 95 of the originating switch 42 plays fake ringing to the caller unit 24 via the trunk 32, the local switch 22 and the line 26 using conventional techniques. Step 160 is then executed by the processor 96.

In step 160, the processor 96 asynchronously waits for one of the following call processing events: call answered, call disconnected or timer expiration. The detector 91 provides detected signalling information to the processor 96 indicating call answered or call disconnected. The timer 93 provides suitable information to the processor 96 indicating that the predetermined interval being timed has expired. As explained above, the information provided by the timer 93 causes the processor 96 to redirect a call when, prior to expiration of the predetermined time interval being timed, the call has not been answered at the primary destination 64 and the call has not been disconnected.

If the predetermined time interval has expired before signalling information that the call has been answered or disconnected is provided to the processor 96 by the detector 91, in step 170, the processor 96 provides control signals to the transmitter 92 for redirecting the call from the primary destination 64 to the secondary destination 84. The control signals provided to the transmitter 92 in step 170 direct the transmitter 92 to provide instructions to all switches in the network 10, including the originating switch 42 and the local switch 62 associated with the voice path between the originating switch 42 and the primary destination 64, to uncouple the voice path using well known techniques. Furthermore, based on the control signals provided by the processor 96, the transmitter 92 transmits the appropriate out-of-band signals to the terminating switch 44 via the signalling link 48, the out-of-band switching unit 46 and the signalling link 50 for establishing a redirection of the call to the secondary destination 84. The terminating switch 44 uses signalling link 50, the out-of-band signalling unit 46 and the signalling link 54 to complete the redirection to the secondary destination 84 only if the signalling link 54 exists. If the signalling link 54 does not exist, the terminating switch 44, instead, will transmit in-band-signals over the trunk 52 to complete the redirection to the secondary destination 84. The processor 96 redirects the call based on the inference that the primary destination 64 is busy, because the call has not been answered at the primary destination 64 after an excessive amount of time has passed since the inception of the call. It is to be understood, of course, that the redirection performed in step 170 according to the process 100 may be performed with regard to any of a plurality of alternate destinations subscribed to by a switched egress ADR customer.

On the other hand, if the timer 93 does not time out the predetermined interval before signalling information representative of the processing event of call answered is detected by the detector 91, in other words, if signalling information is provided to the processor 96 indicating that the call has been answered before the timer 93 measures the predetermined time interval, the processor 96 does not provide control signals for redirecting the call. Likewise, if the timer 93 does not measure the predetermined interval before signalling information representing the processing event of call disconnected is provided to the processor 96 by the detector 91, the processor 96 of the originating switch 42 does not provide control signals for redirecting the call.

As seen from FIG. 2, the processor 96 of the originating switch 42 may ensure that the call is redirected because a busy condition actually existed at the primary destination 64 but could not be detected at the originating switch 42 based on the lack of the transmission of either a busy or free indication by the local switch 62. Thus, the processor 96 of the originating switch 42 performs redirection according to the ADR service feature upon the expiration of a predetermined time interval that starts as of the time when either a busy or free indication at the primary destination 64 is undetected at the originating switch 42.

It is to be understood that the embodiments and variations shown and described above are illustrative of the principles of this invention only and that various modifications may be implemented by those skilled in the art without departing from the scope and spirit of the invention.

We claim:

1. A method for redirecting a telephone call from a busy primary destination to a secondary destination of a switched egress alternative destination redirection (ADR) customer when either a busy or free indication is not provided, comprising the steps of:

determining the primary and secondary destination subscribed to by the ADR customer;

providing signalling information to a local switch for routing the call to the primary destination;

starting a timer for timing a predetermined interval if the local switch does not provide either the busy or the free indication associated with the primary destination; and, redirecting the call to the secondary destination if the timer times the predetermined interval before the call is disconnected or before the call is answered at the primary destination.

2. The method of claim 1, wherein one local network comprises the primary destination and the secondary destination.

3. The method of claim 2, further comprising the step of establishing a voice path from the calling party to the primary destination if the primary destination is determined to be free.

4. The method of claim 1, wherein the primary destination and the secondary destination are contained in a first and second local network, respectively.

5. The method of claim 4, further comprising the step of establishing a voice path from the calling party to the primary destination if the primary destination is determined to be free.

6. The method of claim 1, further comprising the step of establishing a voice path from the calling party to the primary destination if the primary destination is determined to be free.

7. The method of claim 1, wherein the secondary destination is comprised of a plurality of alternate destinations.

8. The method of claim 1 further comprising the step of:

providing an audible indication to the calling party that the call is being processed if the local switch does not provide either the busy or the free indication associated with the primary destination.

9. The method of claim 8, wherein the audible indication is audible ringing.

10. A system for redirecting a telephone call from a busy primary destination to a secondary destination of a switched egress alternative destination redirection (ADR) customer when either a busy or free indication is not provided, comprising:

a caller unit for placing a call to the switched egress ADR customer;

a first local switch for providing signalling information for routing the call to an originating switch, wherein said originating switch determines the primary destination and the secondary destination subscribed to by the ADR customer and provides signalling information for routing the call to a subscribed destination; and, a second local switch for routing the call from the originating switch to a subscribed destination, said originating switch further comprising a timer for timing a predetermined interval, wherein said timer is started if the second local switch does not provide the originating switch with signalling information that includes either the busy or the free indication associated with the primary destination when routing of the call to the primary destination is attempted, and wherein said originating switch provides signalling information to the second local switch for redirecting the call to the secondary destination if the timer times the predetermined interval before the call is disconnected or before the call is answered at the primary destination.

11. The system of claim 10, wherein the secondary destination is comprised of a plurality of alternate destinations.

12. The apparatus of claim 10, wherein the originating switch provides an audible indication to the caller unit that the call is being processed if the second local switch does not provide the originating switch with signalling information that includes either the busy or the free indication associated with the primary destination when routing of the call to the primary destination is attempted.

13. The apparatus of claim 12, wherein the audible indication is audible ringing.

14. A system for redirecting a telephone call from a busy primary destination to a secondary destination of a switched egress alternative destination redirection (ADR) customer when either a busy or free indication is not provided, comprising:

a caller unit for placing a call to the switched egress ADR customer;

a first local switch for providing signalling information for routing the call to an originating switch, wherein said originating switch determines the primary destination and the secondary destination subscribed to by the ADR customer and provides signalling information for routing the call to a subscribed destination;

a second local switch for routing the call from the originating switch to the subscribed primary destination; and, a third local switch for routing the call from the originating switch to the subscribed secondary destination, said originating switch further comprising a timer for timing a predetermined interval, wherein said timer is started if the second local switch does not provide the originating switch with signalling information that includes either the busy or the free indication associated with the primary destination when routing of the call to the primary destination is attempted, and wherein said originating switch provides signalling information to the third local switch for redirecting the call to the secondary destination if the timer times the predetermined interval before the call is disconnected or before the call is not answered at the primary destination.

15. The system of claim 14, wherein the secondary destination is comprised of a plurality of alternate destinations.

16. The system of claim 14, wherein the originating switch provides an audible indication to the caller unit that the call is being processed if the second local switch does not provide the originating switch with signalling information that includes either the busy or the free indication associated with the primary destination when routing of the call to the primary destination is attempted.

17. The system of claim 16, wherein the audible indication is audible ringing.

18. A system for redirecting a telephone call from a busy primary destination to a secondary destination of a switched egress alternative destination redirection (ADR) customer when either a busy or free indication is not provided, comprising:

a calling means for placing a call to the switched egress ADR customer;

a first switching means for providing signalling information for routing the call to a second switching means, wherein the second switching means determines the primary and the secondary destinations subscribed to by the ADR customer and provides signalling information for routing the call to a subscribed destination; and, a third switching means for routing the call from the originating office to a subscribed destination, said second switching means further comprising a timing means for timing a predetermined interval, wherein said timing means is started if the third switching means does not provide the second switching means with signalling information that includes either the busy or the free indication associated with the primary destination when routing of the call to the primary destination is attempted, and wherein said second switching means provides signalling information to the third switching means for redirecting the call to the secondary destination if the timer times the predetermined interval before the call is disconnected or before the call is answered at the primary destination.

19. The system of claim 18, wherein the secondary destination is comprised of a plurality of alternate destinations.

20. The system of claim 18, wherein the second switching means provides an audible indication to the calling means that the call is being processed if the third switching means does not provide the second switching means with signalling information that includes either the busy or the free indication associated with the primary destination when routing of the call to the primary destination is attempted.

21. The system of claim 20, wherein the audible indication is audible ringing.

22. An apparatus comprising:

a signalling information detector for detecting signalling information provided in a switching network;

a signalling information transmitter for providing signalling information for switching calls in the network;

a memory for storing data associated with switching calls in the network;

a timer for timing out predetermined intervals; and, a processor, wherein the processor accesses the memory for determining a primary and a secondary destination subscribed to by an ADR customer when a call is placed to the ADR customer, wherein the processor provides control signals to the transmitter directing the transmitter to provide signalling information to a local switch for routing the call to the primary destination, wherein the processor provides control signals to the timer directing the timer to time a predetermined interval if the local switch does not provide to the transmitter either a busy or free indication associated with the primary destination, and wherein the processor provides control signals to the transmitter for redirecting the call to the secondary destination if the timer times out the predetermined interval before the call is disconnected or before the call is answered at the primary destination.

23. The apparatus of claim 22, wherein the processor provides signalling information to the transmitter directing the transmitter to establish a voice path from the calling party to the primary destination if the primary destination is determined to be free.

24. The apparatus of claim 22, wherein the secondary destination is comprised of a plurality of alternate destinations.

25. The apparatus of claim 22 further comprising:

an announcer for playing an audible indication, wherein the processor provides control signals to the announcer directing the announcer to play the audible indication to the calling party that the call is being processed if the local switch does not provide to the transmitter either the busy or the free indication associated with the primary destination.

26. The apparatus of claim 25, wherein the audible indication is audible ringing.

* * * * *